(12) United States Patent
Doi et al.

(10) Patent No.: US 7,643,712 B2
(45) Date of Patent: Jan. 5, 2010

(54) OPTICAL MODULE AND OPTICAL SWITCHING DEVICE

(75) Inventors: Masaharu Doi, Kawasaki (JP); Tetsu Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/125,957

(22) Filed: May 23, 2008

(65) Prior Publication Data

US 2008/0317424 A1 Dec. 25, 2008

(30) Foreign Application Priority Data

Jun. 22, 2007 (JP) ............................. 2007-164630

(51) Int. Cl.
*G02F 1/295* (2006.01)
*G02B 6/10* (2006.01)
*G02B 6/42* (2006.01)

(52) U.S. Cl. .................... 385/48; 385/129; 385/130; 385/10

(58) Field of Classification Search .................... 385/10, 385/129–132
See application file for complete search history.

(56) References Cited

U.S. PATENT DOCUMENTS

| 7,079,732 | B2 * | 7/2006 | Maruyama et al. ............ 385/48 |
| 7,526,161 | B2 * | 4/2009 | Ishii et al. ..................... 385/48 |
| 7,551,820 | B2 * | 6/2009 | Ishii et al. ..................... 385/48 |
| 2003/0147591 | A1 | 8/2003 | Doi et al. |
| 2005/0265663 | A1 * | 12/2005 | Maruyama et al. ............ 385/47 |
| 2006/0051011 | A1 | 3/2006 | Ohmori et al. |
| 2006/0056002 | A1 * | 3/2006 | Wooten et al. ............... 359/245 |

FOREIGN PATENT DOCUMENTS

| JP | 2003-233047 | 8/2003 |
| JP | 2005/345554 | 12/2005 |
| WO | 2004/092792 A1 | 10/2004 |

* cited by examiner

*Primary Examiner*—Frank G Font
*Assistant Examiner*—Eric Wong
(74) *Attorney, Agent, or Firm*—Staas & Halsey LLP (57) ABSTRACT

The invention relates to an optical device which can increase the spread of a beam diameter in the depthwise direction by a simple configuration in comparison with that by prior art devices. The optical device includes a substrate, an optical path formed on the substrate, and a diffraction propagation region, provided between the optical path and an end face of the substrate, for propagating light emitted from the optical path with diffraction. The diffraction propagation region includes a first groove, formed therein, adapted to block part of components of the propagated light in a depthwise direction of the substrate.

8 Claims, 12 Drawing Sheets

OPTICAL MODULE AND OPTICAL SWITCHING DEVICE

BACKGROUND OF THE INVENTION

1) Field of the Invention

The present invention relates to an optical device suitable for use with an optical communication system.

2) Description of the Related Art

An optical waveguide device is an optical device which implements various functions by using an optical waveguide for confining light in a region formed in a dielectric medium and having a refraction index to propagate the light therein. For example, an optical waveguide device which configures a Mach-Zehnder interferometer using a dielectric substrate such as lithium niobate (LiNbO$_3$: hereinafter referred to as LN) has a very high electro-optic constant and has a high response speed in comparison with a device which has a thermal-optic (TO) effect. Therefore, the optical waveguide device of the type described is widely used as an optical modulator, an optical switch, a variable optical attenuator and so forth.

However, it is known that, with such an optical waveguide device for which a dielectric substrate of LN or the like is used as described above, a phenomenon called temperature drift that the operating point shifts in response to a temperature variation and another phenomenon called DC drift that the operating point shifts in response to application of a DC signal latently occur. If the operating point shifts in response to occurrence of a temperature drift or a DC drift, then the optical output characteristic of the optical waveguide device varies. Therefore, for example, in the case of an optical modulator, modulation in a normally fixed state cannot be achieved.

Figure 11:
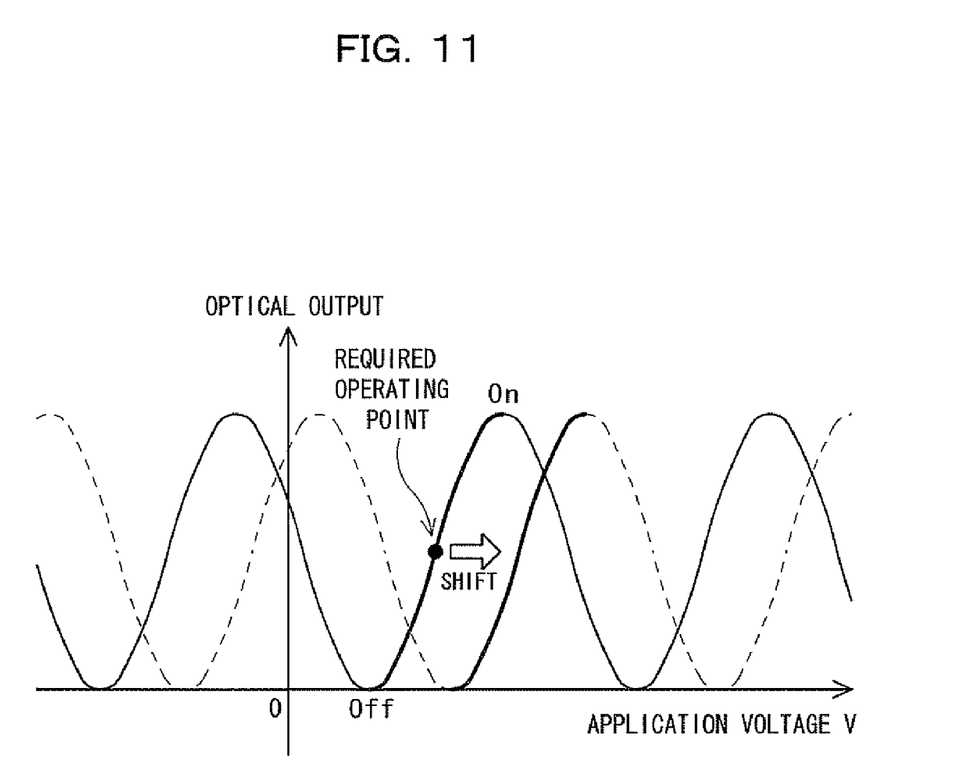
FIG. 11 is a diagram illustrating an operating point shift.

In particular, an optical output of a Mach-Zehnder type optical modulator varies in accordance with $\cos^2(\Delta\phi/2)$. The parameter $\Delta\phi$ in the expression represents a phase variation amount applied by an interacting portion of the Mach-Zehnder interferometer and is represented, in the case of a Z-cut LN substrate, by a relationship of $\Delta\phi=\{\pi \cdot ne^3 \cdot \gamma_{33} \cdot 1/(\lambda \cdot d)\} \cdot V$, where ne is the refraction index of the optical waveguide, $\gamma_{33}$ the electro-optic constant, l the length of electrodes provided on two parallel optical waveguides, $\lambda$ the optical wavelength, d the distance between electrodes, and V the applied voltage. The optical output characteristic of the optical modulator is represented by such a curve as shown in FIG. 11 wherein the axis of abscissa represents the applied voltage V.

In such an optical modulator as described above, it is desired usually to set the operating point so as to be placed in a middle state between an on state and an off state when the applied voltage between the electrodes is 0 V. However, as seen in FIG. 11, an actual operating point is frequently displaced (shifts) from the desired operating point because of a fabrication error, various stresses and so forth. Against such displacement of the operating point, generally a DC bias is applied to carry out adjustment of the actual operating point to the desired operating point.

However, since the operating point adjusted by a DC bias shifts in response to such a DC drift as described above, in order to achieve stabilization of the operating point, it is necessary to normally monitor an optical output and control the DC bias based on a result of the monitoring. Such monitoring of an optical output as just described is used restrictively only for an optical modulator, but is required, for example, also in a Mach-Zehnder type variable optical attenuator, to adjust the optical attenuation amount in response to a temperature variation or the like.

Japanese Patent Laid-Open No. 2003-233047 (hereinafter referred to as Patent Document 1) discloses a configuration which includes, in order to obtain monitor light of an intensity suitable for use in the bias control described above, a monitoring optical waveguide for guiding part of output light as monitor light and an attenuation section for attenuating the monitor light.

Figure 12:
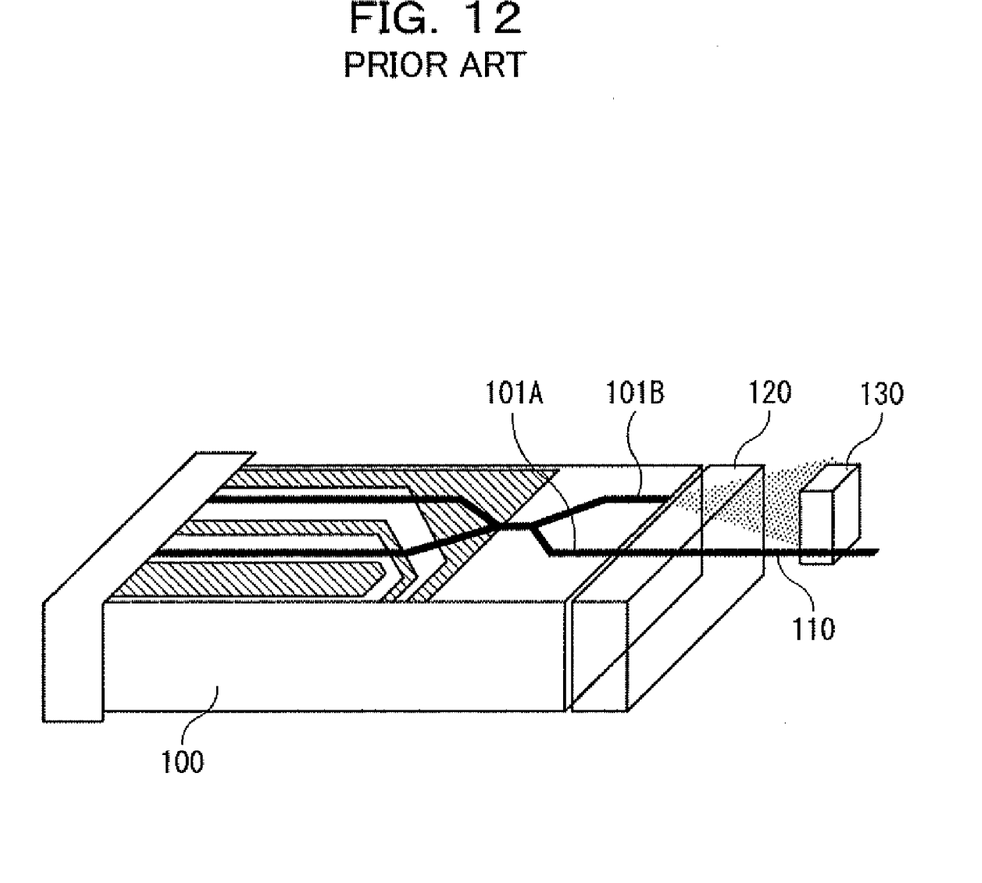
FIG. 12 is a view illustrating a conventional technique.

Incidentally, as one of such optical waveguide devices as just described, an optical waveguide device of a butt joint type configuration is known wherein, in order to guide an emitted optical signal to an output optical fiber, an end face of an optical waveguide and the output optical fiber are directly connected to each other. In an optical waveguide device having the butt joint type configuration, for example, as shown in FIG. 12, a fiber fixing member 120 such as a V-groove fiber block or a glass ferrule is used to fix an output optical fiber 110 to an emission end face of an optical waveguide 101A which is formed on a substrate 100 together with an optical waveguide 101B and can output main signal light so that required connection strength of the output optical fiber to the end face of the optical waveguide is secured.

It may seem a possible idea to form such an optical waveguide device having a butt joint type configuration as described above with reference to FIG. 12 such that, in order to monitor the optical output from the optical waveguide 101B, for example, a light reception device 130 for optical output monitoring is disposed on the reverse side of the fiber fixing member 120 (on the opposite side to the optical waveguide device). However, interference disposition between the output optical fiber 110 and the light reception device 130 not only makes it difficult to dispose the light reception device 130 at a position at which monitor light can be sufficiently received but also makes it difficult for the light reception device 130 to sufficiently receive monitor light emitted from the optical waveguide 101B on the monitor side because the fiber fixing member 120 makes as an obstacle.

International Publication No. 2004/092792 (hereinafter referred to as Patent Document 2) disclosed a technique wherein a groove is formed in the proximity of an end portion of a monitoring optical waveguide on the optical output side on a substrate on which an optical waveguide is formed such that light outputted from the monitoring optical waveguide is reflected by a reflecting face provided by a side wall of the groove so that the reflection light is emitted from a side face of the substrate. Consequently, an output side end face of an output optical waveguide to which the output light is guided and the side face of the substrate to which monitor light is guided are configured as different faces from each other so that the interference disposition between the output optical fiber 110 and the light reception device 130 in the optical waveguide device described above with reference to FIG. 12 can be prevented. However, in the technique disclosed in Patent Document 2, while a light reception device such as a photodiode is disposed in the proximity of the device in order to receive monitor light, if the spread in mode diameter of monitor light at a light reception position is small, then it is necessary to adjust the incorporation position of the light reception device with high accuracy.

On the other hand, Japanese Patent Laid-Open No. 2005-345554 (hereinafter referred to as Patent Document 3) disclosed a different technique wherein a side wall of a groove for reflecting light outputted from a monitoring optical waveguide is formed in a convex shape as in the technique of Patent Document 2 described above such that the beam diameter of monitor light reflected from the side wall is spread by diffraction so as to achieve increase of the position adjustment tolerance when a light reception device for receiving monitor light emitted from the substrate side face side is incorporated. For example, in FIG. 4 of Patent Document 3, it is illustrated to increase the spread of monitor light after reflection in a horizontal direction of a substrate face, and, in FIG. 13 of Patent Document 3, a technique is illustrated wherein the shape of a side wall face of a reflection groove in a depthwise direction is formed as a convex shape toward the outside of the groove so that the spread in beam diameter in a depthwise direction by diffraction is provided more effectively than in an alternative case wherein the shape of the side wall face of the reflection groove in the depthwise direction is formed as a straight shape.

However, while, in the above-described technique disclosed in Patent Document 3, the shape of the side wall face of the reflection groove in the depthwise direction is formed as a convex shape toward the outside of the groove so that the spread of the beam diameter in the depthwise direction by the diffraction increases, in such a situation that the depth is limited from a requirement for security of required strength of a substrate, a high technique is required for such a method wherein the shape of a side wall face of a reflection groove in the depthwise direction is formed as a convex shape as described above, and it is not easy to obtain a configuration wherein an expected spread by diffraction can always be obtained.

SUMMARY OF THE INVENTION

It is an object of the present invention to provide a technique which can increase the spread of a beam diameter in the depthwise direction by a simple configuration in comparison with that by the conventional techniques.

It is another object of the present invention to provide an optical device which can increase the tolerance relating to the mounting position of a light reception device in comparison with the conventional techniques to further facilitate adjustment of the mounting position of the light in comparison with that in the conventional techniques.

It is to be noted that, in addition to the objects described above, also it shall be understood as an object of the present invention to achieve such effects as are provided by the constitutions of several embodiments of the present invention hereinafter described but are not provided by the conventional techniques.

In order to attain the objects described above, according to an aspect of the present invention, there is provided:

(1) an optical device, comprising a substrate, an optical path formed on the substrate, and a diffraction propagation region, provided between the optical path and an end face of the substrate, for propagating light emitted from the optical path with diffraction, wherein the diffraction propagation region includes a first groove, formed therein, adapted to block part of components of the propagated light in a depthwise direction of the substrate.

(2) In the optical device according the paragraph (1), the optical path may be configured so as to emit light in an obliquely downward direction with respect to a horizontal plane of the substrate on which the optical path is formed.

(3) In the optical device according to the paragraph (1) or (2), the optical device may further comprise an optical waveguide formed on the substrate, the substrate includes a second groove, formed on the output side of the optical waveguide therein, adapted to reflect light outputted from the optical waveguide, and the optical path may include the optical waveguide formed on the substrate and a path wherein the light is reflected by the second groove.

(4) In the optical device according to the paragraph (3), the optical path may further include a ridge optical path formed on the downstream side in the light propagation direction with respect to the reflection groove.

(5) In the optical device according to the paragraph (4), the ridge optical path may be configured so as to be sandwiched by a pair of third grooves formed on the opposite sides with respect to the light propagation direction.

(6) In the optical device according to the paragraph (5), one of the third grooves may be formed integrally with the second groove.

(7) In the optical device according to the paragraph (3), the optical device may further comprise an optical waveguide for a main signal formed on the substrate, and the optical waveguide may include an optical monitoring waveguide adapted to monitor guide a monitor light for monitoring the main signal.

In this manner, with the present invention, there is an advantage that, since the value of the NA of the substrate surface in the vertical direction can be increased by the first groove, the tolerance in the vertical direction with respect to the substrate surface regarding the mounting position of the light reception device can be increased with a simple configuration and adjustment of the mounting position can be carried out easily in comparison with that by the conventional techniques.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

In the following, embodiments of the present invention are described with reference to the drawings.

It is to be noted that the present invention is not limited to the embodiments described below. Further, not only the objects described above but also other technical subjects, means for solving the technical subjects and operation/working-effects become apparent from the following disclosure of the embodiments of the present invention.

[A] Description of the First Embodiment of the Present Invention

A first embodiment of the present invention is described below with reference to the drawings.

Figure 1:
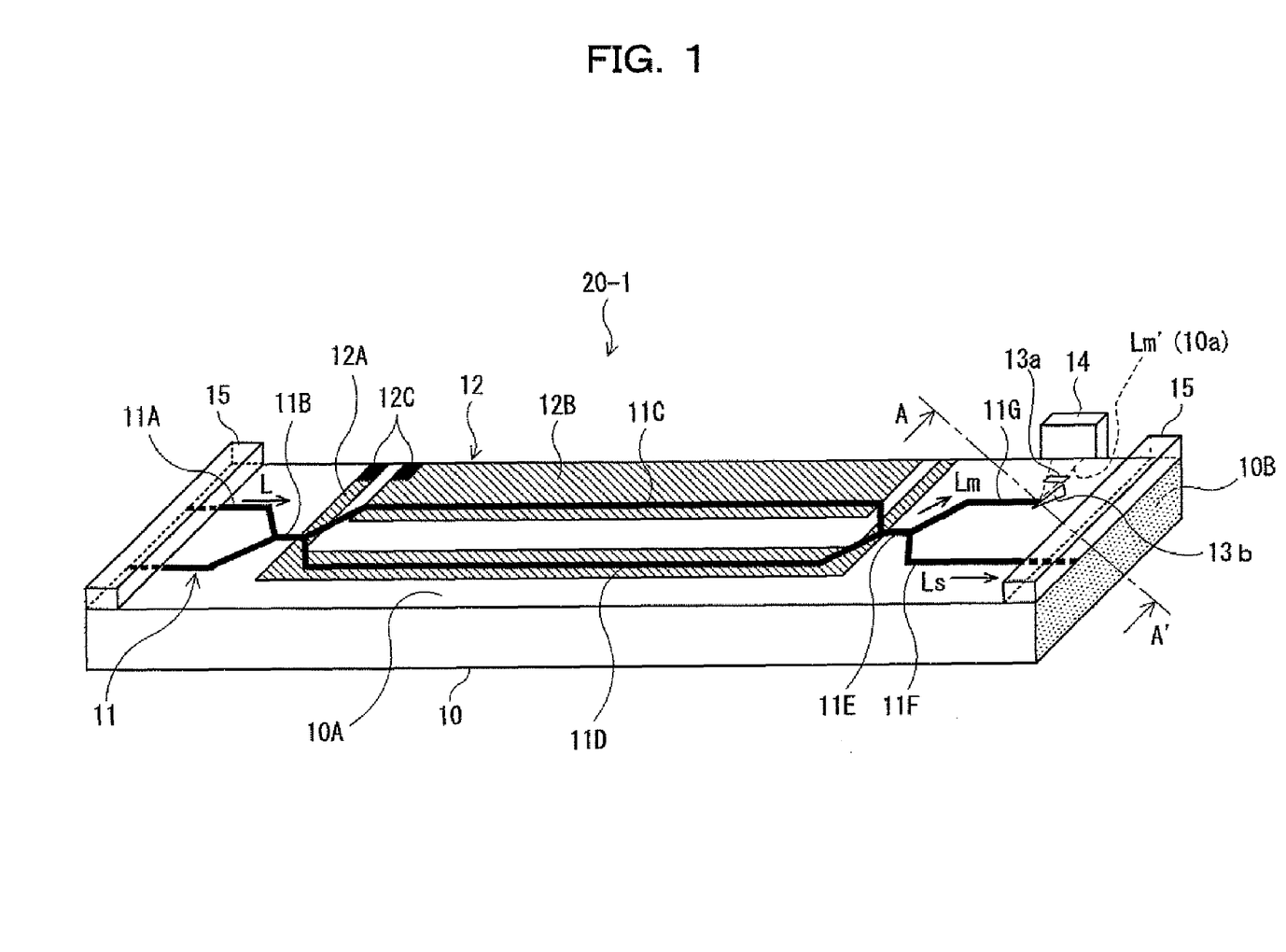
FIG. 1 is a schematic perspective view showing an optical device according to a first embodiment of the present invention.

FIG. 1 is a schematic perspective view showing an optical device 20-1 according to the first embodiment of the present invention. Referring to FIG. 1, the optical device 20-1 shown includes a substrate 10, a Mach-Zehnder type optical waveguide 11 formed on an upper face 11A of the substrate 10, an electrode 12 formed on the upper face 10A of the substrate 10 along the optical waveguide 11, a first groove 13a, a second groove 13b, a diffraction propagation region 10a, a light reception device 14 which may be a photodiode or the like, and a block 15.

For example, a Z-cut LN substrate or the like is used as the substrate 10. The optical waveguide 11 includes an input waveguide 11A, an input side coupler 11B, parallel waveguides 11C and 11D, an output side coupler 11E, a main signal light output waveguide 11F and a monitor light output waveguide 11G, and configures a Mach-Zehnder interferometer.

In the input waveguide 11A, an end thereof facing a side face (left side face in FIG. 1) of the substrate 10 receives light L, and the other end thereof is connected to one of two input ports of the input side coupler 11B. The input side coupler 11B branches the light L from the input waveguide 11A into two lights and applies the branched lights individually to the parallel waveguides 11C and 11D. The output side coupler 11E multiplexes the lights propagated along the parallel waveguides 11C and 11D and branches the multiplexed light into main signal light Ls and monitor light Lm so as to be applied to the main signal light output waveguide 11F and the monitor light output waveguide 11G, respectively. Here, as the input side and output side couplers 11B and 11E, for example, a directional coupler or a multimode interference (MMI) coupler is used.

The electrode 12 is configured, for example, from electrode patterns 12A and 12B and electrode pads 12C. The electrode pattern 12A is patterned in a required shape wherein it passes above the parallel electrode 11D. On the other hand, the electrode pattern 12B is patterned in a required shape wherein it passes above the parallel electrode 11C in a spaced relationship by a fixed distance from the electrode pattern 12A. The electrode pads 12C correspond to terminals for applying a high-frequency electric signal to the electrode patterns 12A and 12B. It is to be noted that, where one of the electrode patterns is used as a ground electrode, an electrode pad of the ground electrode is connected to a ground terminal.

Figure 2:
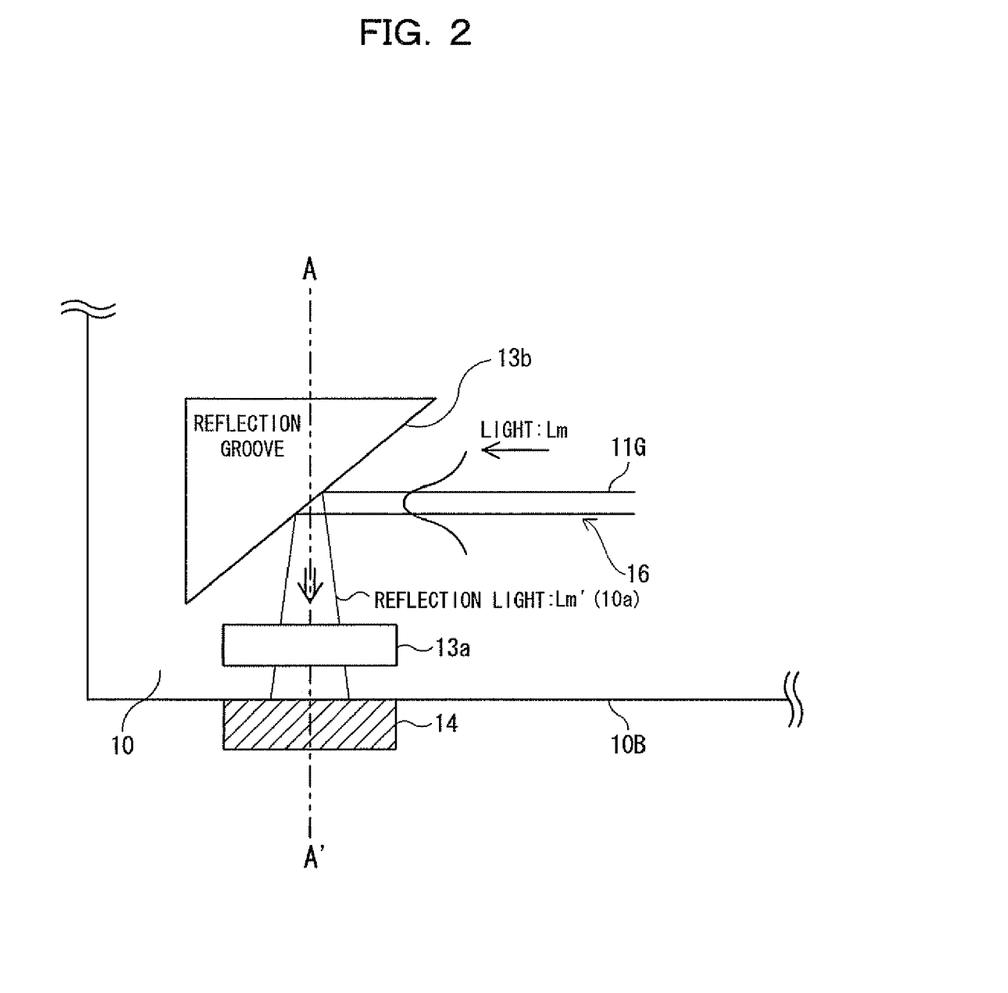
FIGS. 2 and 3 are views showing a configuration of part of the first embodiment.

FIG. 2 is a view illustrating particularly a manner wherein the light Lm propagated along the monitor light output waveguide 11G is diffracted as light Lm' reflected by the second groove 13b and is inputted to the light reception device 14. Here, the second groove 13b is a reflection groove which is formed in the proximity of an end portion of the monitor light output waveguide 11G on the output side and reflects the light Lm outputted from the monitor light output waveguide 11G.

In particular, while a side face portion of the second groove 13b opposed to the monitor light output waveguide 11G side is configured as a reflection face for totally reflecting the monitor light Lm emitted from a terminal end of the monitor light output waveguide 11G, the side face portion is configured such that the reflection light Lm' is propagated toward a substrate side face (substrate longitudinal side face) 10B different from the emission end face of the main signal light output waveguide 11F as shown in FIG. 2.

Figure 3:
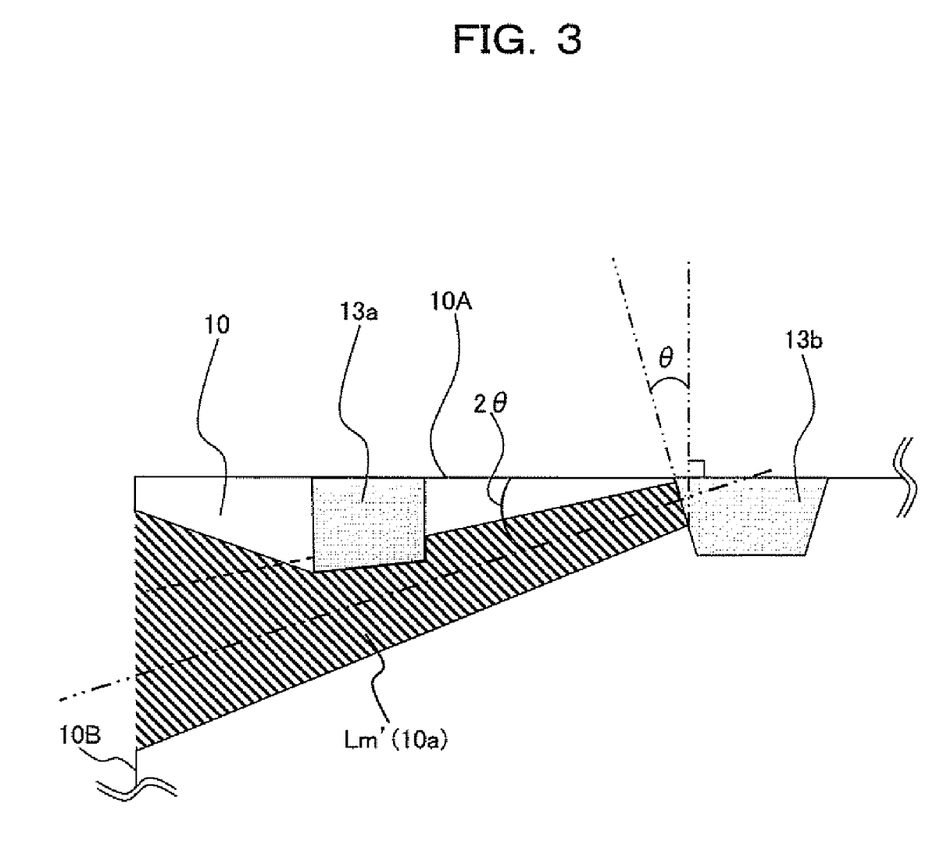

FIG. 3 is a sectional view taken along line A-A' in FIG. 2. As shown in FIG. 3, the side face portion of the second groove 13b is inclined by an angle θ (for example, approximately 10 degrees) with respect to a vertical direction of the substrate 10, and the reflection light Lm' reflected by the side face portion is propagated downwardly in FIG. 3 in the inside of the substrate 10. In this instance, since light outputted from the monitor light output waveguide 11G is propagated in parallel to the surface of the substrate 10 and is inputted to the second groove 13b, the angle of the reflection light Lm' with respect to the surface of the substrate 10 is 2θ.

Further, the light reception device 14 receives the monitor light Lm' reflected by the second groove 13b and emitted from the longitudinal side face 10B of the substrate 10. In particular, the light reception device 14 is configured so as to receive the monitor light Lm' reflected by the reflection groove 13 and emitted from the longitudinal side face 10B of the substrate and generate an electric signal which varies in response to the power of the monitor light Lm'.

The electric signal as a result of the light reception can be applied to bias voltage control for the Mach-Zehnder type optical modulator configured from the optical waveguide 11 and electrode 12 described above. In particular, the DC bias described is feedback controlled based on the electric signal generated in response to the monitor light Lm' and obtained from the light reception device 14 so that stabilization of an operating point can be achieved.

Here, in a substrate region between the second groove 13b and the longitudinal side face 10B of the substrate 10 from which light is emitted toward the light reception device 14, the diffraction propagation region 10a is provided along which the light emitted (reflected) from the second groove 13b is propagated with diffraction. In particular, the light Lm' reflected by the second groove 13b is emitted from the substrate end face to the light reception device 14 in a state wherein the beam diameter thereof is increased. In other words, as shown in FIG. 2, the optical path 16 formed on the substrate 10 is configured from the monitor light output waveguide 11G and a path along which light is reflected by the second groove 13b.

Then, the first groove 13a for reducing the beam diameter of propagated light in the depthwise direction of the substrate 10 is formed in the diffraction propagation region 10a. While the light Lm' passes below the first groove 13a in the substrate when the light Lm' propagates in a portion along which the first groove 13a is formed as shown in FIG. 3, part of the reflection light beam is cut by the groove 13a, or in other words, the range spread by diffraction is limited, thereby to enhance the beam confining effect (to increase the value of the NA (Numerical Aperture) so that an action of the diffraction spreading of the light Lm' after passed through the first groove 13a in the depthwise direction of the substrate 10 can be still further increased.

Since, by such an increasing function of the beam diameter by the first groove 13a as described above, the tolerance for a position at which the light reception device 14 for receiving reflection light is to be disposed can be increased, adjustment of the mounting position of the light reception device 14 on the longitudinal side face of the substrate can be carried out easily. In particular, by forming the first groove 13a, the beam diameter of light emitted from the substrate longitudinal side face 10B in a vertical direction of the substrate can be increased in comparison with that of an alternative case wherein the first groove 13a is not formed. By increasing the beam diameter in this manner, when light reception position adjustment is carried out so that defined light power is received by the light reception device 14, the light reception position in the vertical direction of the substrate surface can be adjusted within a range of a comparatively wide range.

It is to be noted that the first and second grooves 13a and 13b are formed at predetermined positions on the upper face of the substrate 10, for example, by utilizing a photolithography method or the like, and, for example, the groove disclosed in Patent Document 2 or 3 described above can be applied as the second groove 13b. Further, if the beam diameter of light propagated through the diffraction propagation region 10a in the depthwise direction of the substrate 10 can be reduced, then a diffraction spreading effect on the downstream side of the first groove 13a can be increased. Therefore, as long as the diffraction spreading effect is obtained, not only an arbitrary contour shape and depth but also an optical distance from the second groove 13b can be applied to the first groove 13a.

However, if the first groove 13a to which the contour shape and depth and the distance from the second groove 13b described above are optimally applied is formed, then an optimum diffraction spreading effect can be obtained. FIGS. 4 to 7 are views illustrating derivation of the size and disposition of the first groove 13a for increasing the beam diameter of light after reflection by the second groove 13b in a vertical direction.

Figure 4:
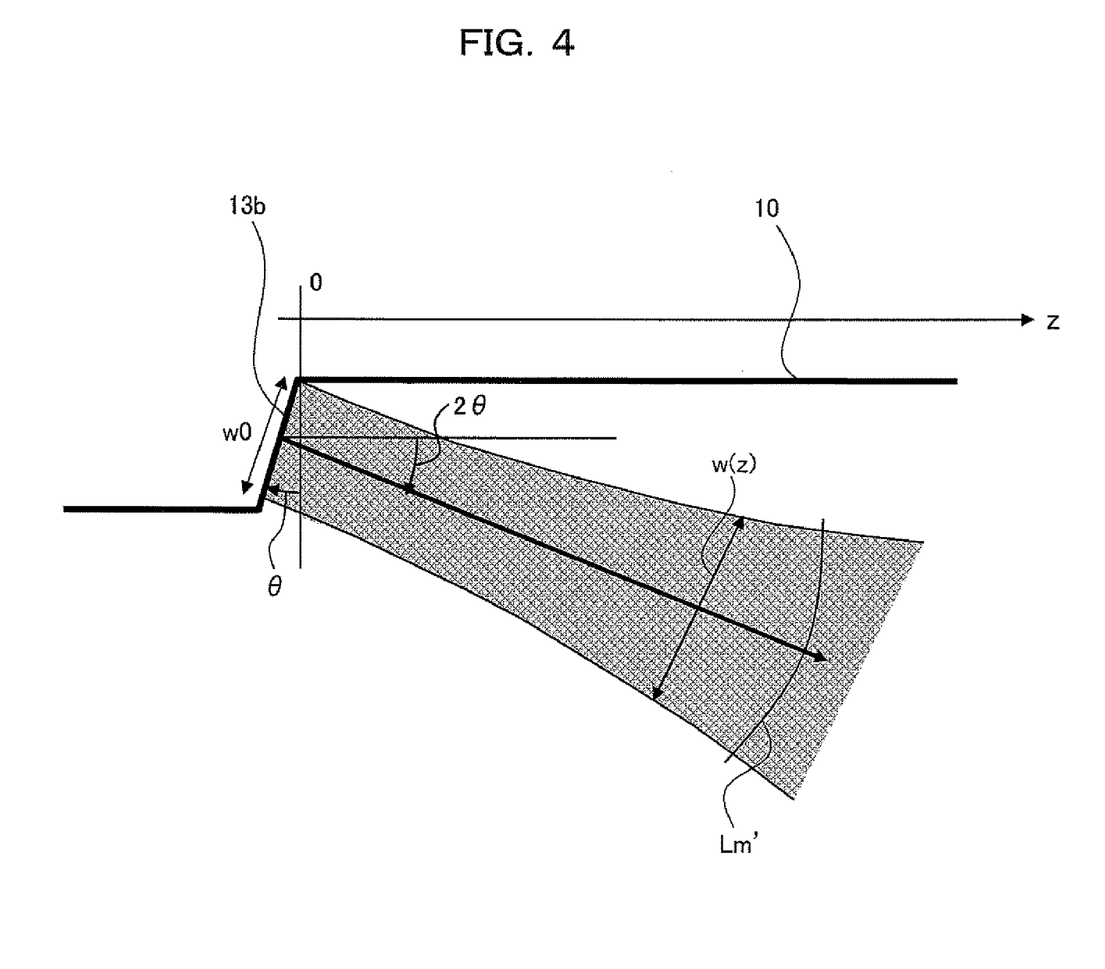
FIGS. 4 to 7 are views illustrating derivation of the disposition and size of a first groove for increasing the beam diameter in a vertical direction after reflection by a second groove in the first embodiment.

If it is assumed that the shape of light reflected by the second groove 13b is a Gaussian beam shape, the beam diameter of the light reflected by the side face portion which forms the reflection face portion of the second groove 13b gradually increases as the light propagates along the diffraction propagation region 10a as seen in FIG. 4. At this time, if the optical wavelength is represented by λ, the beam diameter upon reflection by the second groove 13b by w0 and the distance after reflection by the second groove 13b by z, then the beam diameter w (z) (width equal to $1/e^2$) at z is given by the following expression (1):

$$w(z) = w0\sqrt{1 + (\lambda \cdot z/(\pi w0^2)^2)} \quad (1)$$

Figure 5:
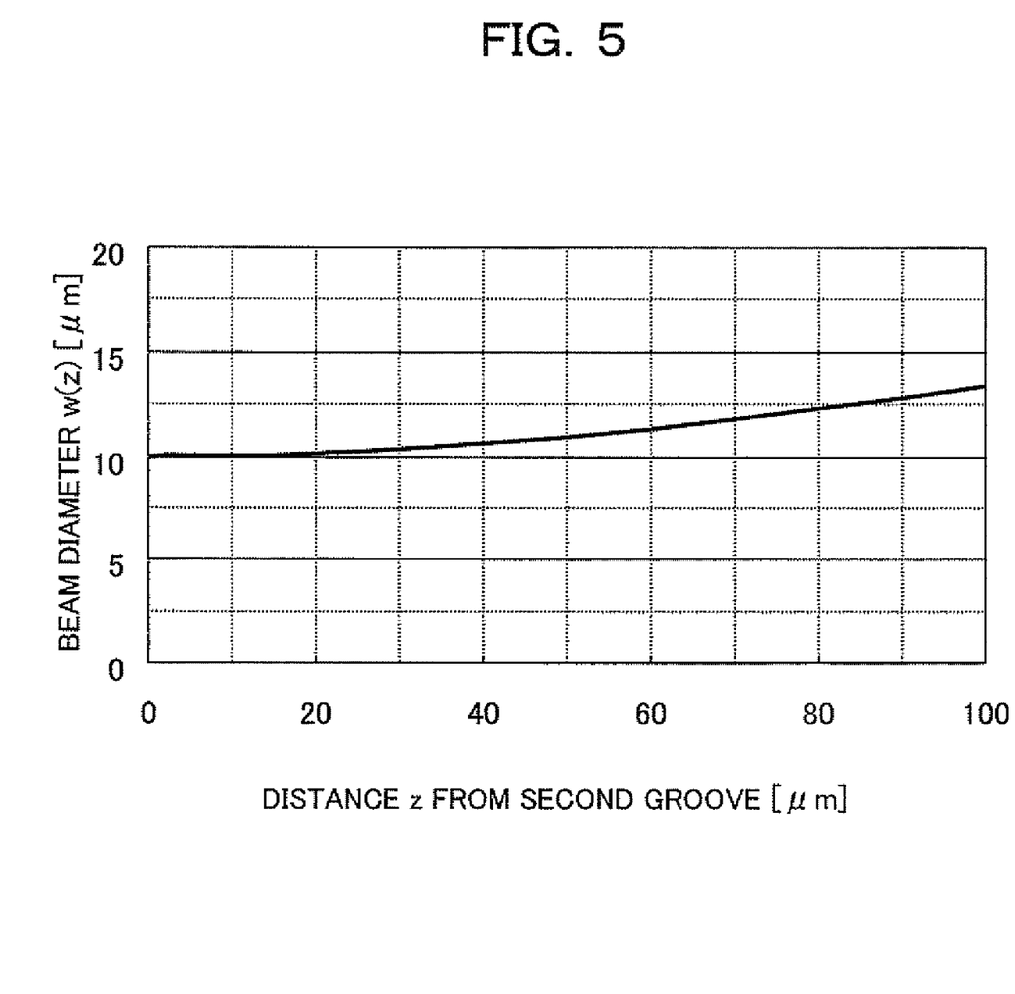

FIG. 5 is a view illustrating an example of the spread of the beam diameter at the light propagation position z where the beam diameter w0 upon reflection by the second groove 13b is w0=10 μm. In the case illustrated in FIG. 5, the beam diameter does not increase very much where the distance from the second groove 13b is up to approximately 50 μm. Accordingly, within a range within which the beam diameter does not increase very much as described above, even if the distance on an axis parallel to the surface of the substrate 10 from the center of the beam is represented by z, the beam diameter w can be derived as a beam diameter similar to that derived in accordance with the expression (1).

Figure 6:
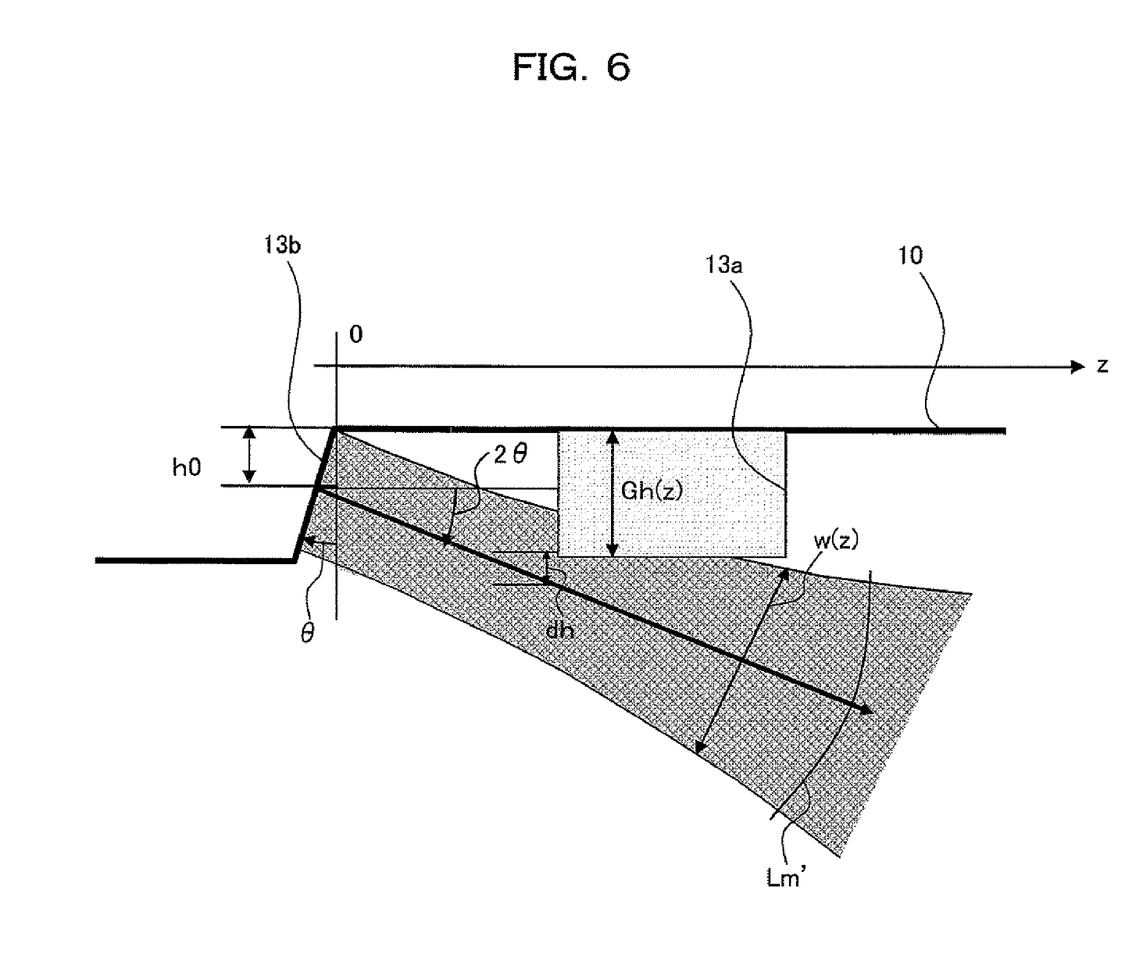

In this instance, for example, as shown in FIG. 6, the first groove 13a is formed at a propagation position on the downstream side of the reflection light displaced by the distance z from the second groove 13b. At this time, where the depth at the position z in the first groove 13a is represented by Gh (z) and an upper portion of a beam from the position of dh upwardly with respect to the beam center is cut by the first groove 13a, the depth Gh (z) can be represented by the following expression (2) by using an angle θ of the groove and a value of dh:

$$Gh(z) = (h0 - dh) + (\alpha + z) \cdot \tan(2\theta) \quad (2)$$

where h0 is the distance from the substrate surface to the beam center at the second groove 13b and α is the distance (h0·tan θ) between a point at which the beam center comes into the first groove 13a and an end portion of the first groove 13a on the surface of the substrate 10. Since α has a sufficiently low value with respect to z, the expression (2) can also be approximated to an expression (2').

$$Gh(z) = (h0 - dh) + z \cdot \tan(2\theta) \quad (2')$$

Figure 7:
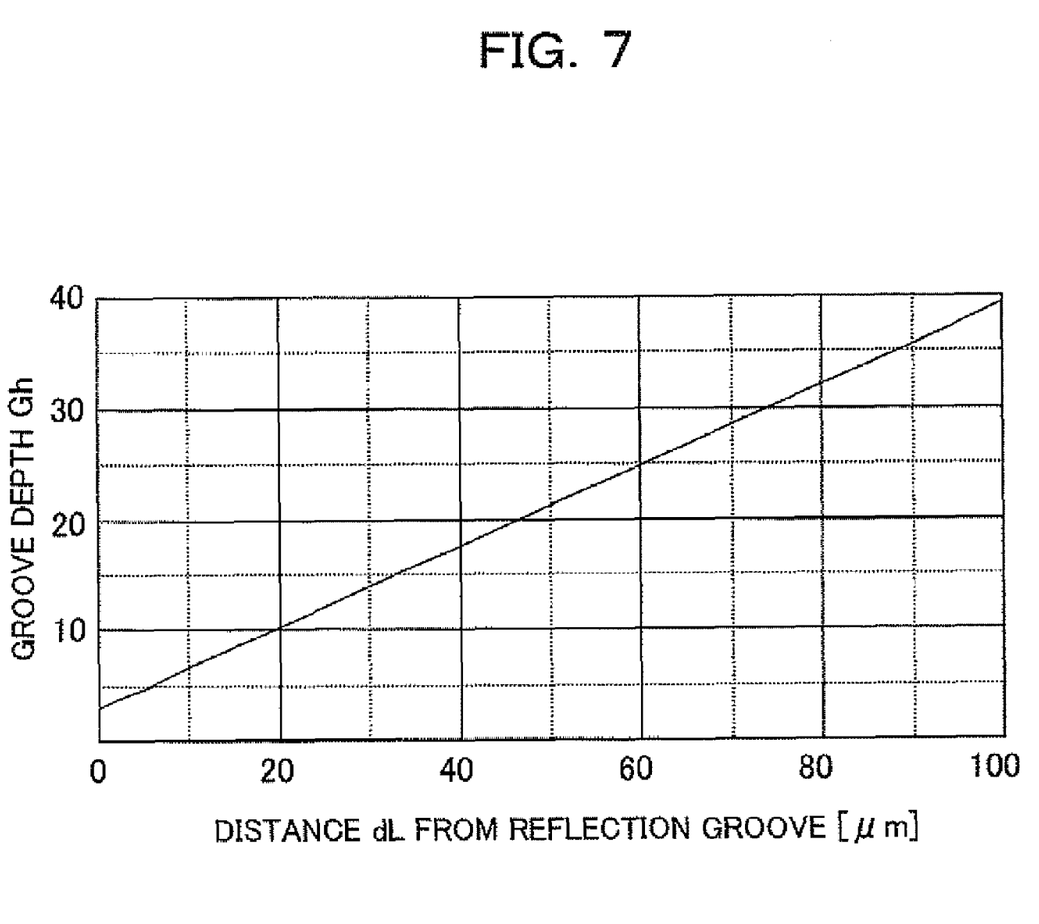

In this manner, the depth of the first groove 13a can be defined as given by the expression (2') from the inclination angle θ of the reflection face of the second groove 13b, the position z at which the groove 13a is formed, and the distance dh between the bottom face portion of the first groove 13a and the beam center. FIG. 7 is a diagram illustrating a relationship of the depth Gh (z) of the first groove 13a to the position z at which the first groove 13a is formed where the values of dh, h0 and θ are set in advance to predetermined values.

It is to be noted that, in order to simplify the formation step of the first and second grooves 13a and 13b, where it is assumed to form the first and second grooves 13a and 13b through the same process, preferably the first and second grooves 13a and 13b have an equal depth. Where almost all of the light of the monitor waveguide 11G is reflected, approximately 6 to 7 μm is required for the depth of the second groove 13b although it depends upon the production condition of the waveguide. In this instance, if it is assumed that Gh (z) is set 6 to 7 μm, then z is determined uniquely by the expression (2'). Here, θ and h0 are determined depending upon process conditions and dh is determined in advance depending upon the tolerance width at the position of the light reception device. In this manner, the formation position of the first groove 13a which can be represented by z can be derived uniquely.

In the optical waveguide device 20-1 configured in such a manner as described above, the light L provided to the light inputting side face of the substrate 10 is propagated along the input waveguide 11A and branched into two lights by the input side coupler 11B, and the branched lights individually propagate along the parallel waveguides 11C and 11D. At this time, in response to an electric signal applied to the electrode patterns 12A and 12B, a phase difference is provided between the lights propagated along the parallel waveguides 11C and 11D, and the lights are multiplexed by the output side coupler 11E. Thereafter, the multiplexed light is branched into main signal light Ls and monitor light Lm. The main signal light Ls is propagated along the main signal light waveguide 11F and then emitted from the side face of the substrate 10.

Further, the monitor light is outputted from the end portion of the monitor light output optical waveguide 11G and is totally reflected by the second groove 13b such that the propagation direction thereof is changed over. At this time, since the reflection face of the second groove 13b is inclined obliquely with respect to the vertical direction of the substrate 10, the monitor light Lm' totally reflected by the second groove 13b is propagated in the diffraction propagation region 10a in the substrate 10 and diverted downwardly from the surface 10A of the substrate 10.

Then, when the light Lm' passes the diffraction propagation region 10a (inside of the substrate 10) corresponding to the position at which the first groove 13a is formed, the beam diameter of the propagated light in the depthwise direction of the substrate 10 can be reduced by the first groove 13a. Therefore, the beam confining effect can be increased. Consequently, a diffraction spreading action of the light Lm' after passed through the first groove 13a in the vertical direction with respect to the substrate surface 10A is increased in comparison with that in an alternative case wherein the first groove 13a is not formed. Accordingly, the tolerance of the disposing position of the light reception device 14 in the vertical direction with respect to the substrate surface 10A can be increased.

It is to be noted that the light reception device 14 receives the monitor light whose beam diameter is increased and outputs an electric signal having a level corresponding to the light quantity of the monitor light. A control section not shown receives the electric signal from the light reception device 14 and carries out feedback control of the voltage of a DC bias to be applied to the electrode 12 in response to the level of the electric signal. Consequently, stabilization of the operating point and so forth can be achieved.

In this manner, with the optical device 20-1 according to the first embodiment of the present invention, there is an advantage that, since the value of the NA in the vertical direction of the substrate surface 10A can be increased by the first groove 13a, the tolerance of the mounting position of the light reception device 14 in the vertical direction with respect to the substrate surface 10A can be increased with a simple configuration and adjustment of the mounting position can be simplified in comparison with the conventional technique.

It is to be noted that, in the first embodiment described above, the reflection face of the second groove 13b may be configured in a planar shape or may be configured so as to function as a convex face shape with respect to incoming light as disclosed in Patent Document 3 mentioned hereinabove. Since, if the reflection face of the second groove 13b is configured in such a manner as just described, then the diffraction spread of the reflection light can be increased in comparison with that in an alternative case wherein the shape of the reflection face of the second groove 13b is a planar shape, not only the effect of the diffraction spread of the reflection light by the first groove 13a but also the tolerance for the mounting position of the light reception device 14 can be improved.

[B] Description of the Second Embodiment of the Present Invention

Figure 8:
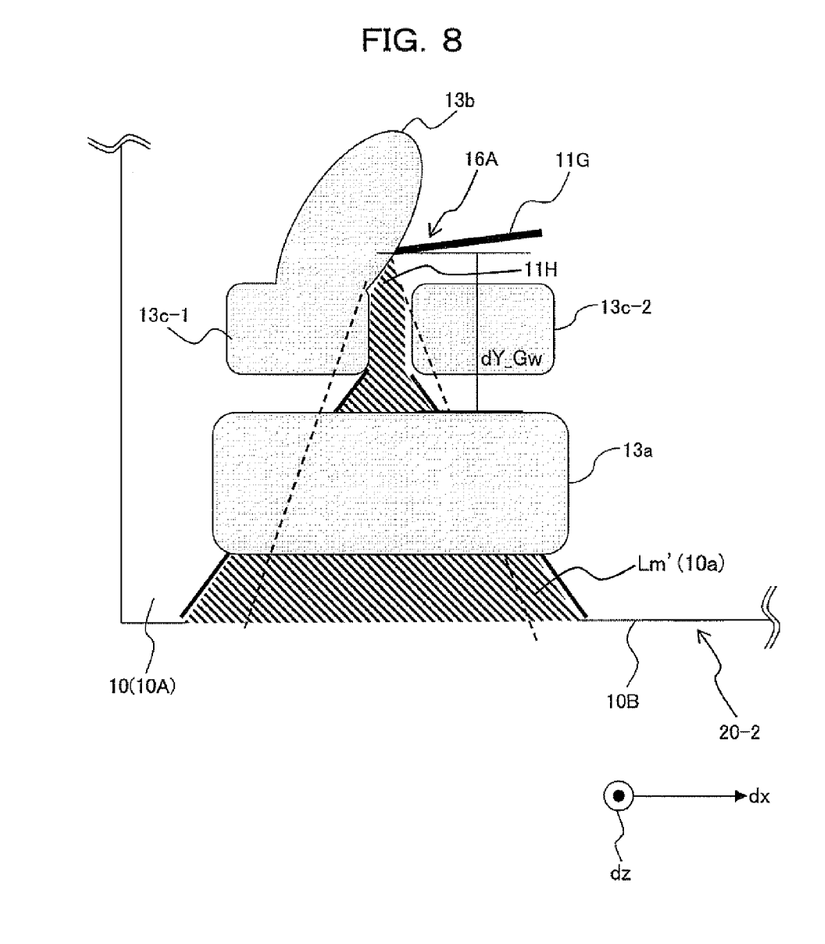
FIG. 8 is a view showing part of an optical device according to a second embodiment of the present invention.

FIG. 8 is a view showing part of an optical device 20-2 according a second embodiment of the present invention as viewed from above and particularly illustrating a manner wherein light reflected by the second groove 13b in the first embodiment is propagated toward the substrate end face 10B.

As seen in FIG. 8, in the optical device 20-2 according to the second embodiment, the second groove (reflection groove) 13b in the first embodiment described above is configured as a groove having an elliptical profile, and a pair of third grooves 13c-1 and 13c-2 for forming a ridge optical path 11H are further formed on the downstream side of the second groove 13b in the light propagation direction.

In particular, the paired ridge grooves 13c-1 and 13c-2 as the third grooves are formed at a portion to which reflection light just after light from the monitor light output waveguide 11G is reflected by the second groove 13b is propagated and the region sandwiched by the ridge grooves 13c-1 and 13c-2 is configured as the ridge optical path 11H wherein the spread of the reflection light in a direction toward the surface of the substrate 10 is suppressed by diffraction.

In particular, the ridge optical path 11H is formed by forming the third grooves 13c-1 and 13c-2 on the left and right of the region which is a portion at which monitor light just after reflection by the second groove 13b is still passing in the proximity of the surface of the substrate 10 and through which the monitor light passes, and part of the monitor light is cut on the left and right sides thereof so as to increase the NA of the monitor light in the left and right direction (horizontal direction to the substrate 10). The third grooves 13c-1 and 13c-2 can be formed in a spaced relationship from each other so that the ridge optical path 11H is formed so as to have, for example, a width of approximately 7 μm.

Accordingly, the ridge optical path 11H formed on the downstream side in the light propagation direction with respect to the second groove 13b cooperates with the monitor light output waveguide 11G and a path on which light is reflected by the second groove 13b to configure an optical path 16A formed on the substrate 10.

It is to be noted that, since one (in FIG. 8, the groove 13c-1) of the paired grooves 13c-1 and 13c-2 can be formed integrally with the second groove 13b as shown in FIG. 8, at least the grooves 13c-1 and 13c-2 can be formed through the same processing procedure. Consequently, the processing procedure can be simplified. Also it is possible to fabricate the grooves 13b, 13a, 13c-1 and 13c-2 through the same processing procedure, and, in this instance, the depths of the grooves 13b, 13a, 13c-1 and 13c-2 can be set substantially equal to each other.

In the optical device 20-2 according to the second embodiment configured in such a manner as described above, in addition to the beam expansion function (refer to FIG. 3) in the depthwise direction of the substrate 10 by the first groove 13a similar to that according to the first embodiment described above, a beam expansion function in the horizontal direction (substrate surface direction) of the substrate 10 can be implemented by propagating the monitor light along the ridge optical path 11H just after reflection by the second groove 13b as shown in FIG. 8.

Figure 9A:
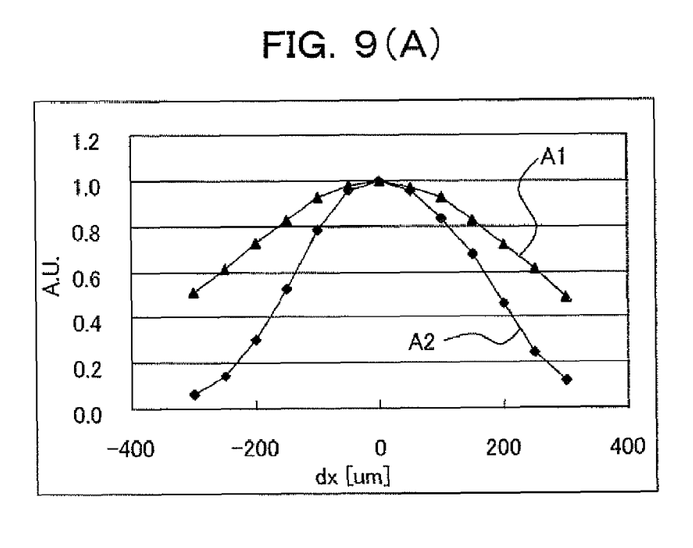
FIGS. 9(A), 9(B) and 10 are diagrams illustrating working effects of the second embodiment of the present invention.

FIG. 9(A) is a view illustrating an intensity distribution (A1) of the monitor light emitted from the side face 10B of the substrate 10 in the optical device 20-2 configured in such a manner as seen in FIG. 8 in the parallel direction (dx direction) to the surface of the substrate 10 in contrast to that in an alternative case (A2) wherein the first and third grooves 13a, 13c-1 and 13c-2 are not formed. Since, as seen in FIG. 9(A), in the case (A1) wherein the third grooves 13c-1 and 13c-2 are formed, the diffraction spread of light in the dx direction can be increased in comparison with that in the case (A2), the range wherein the intensity distribution is comparatively great can be increased in the dx direction.

Figure 9B:
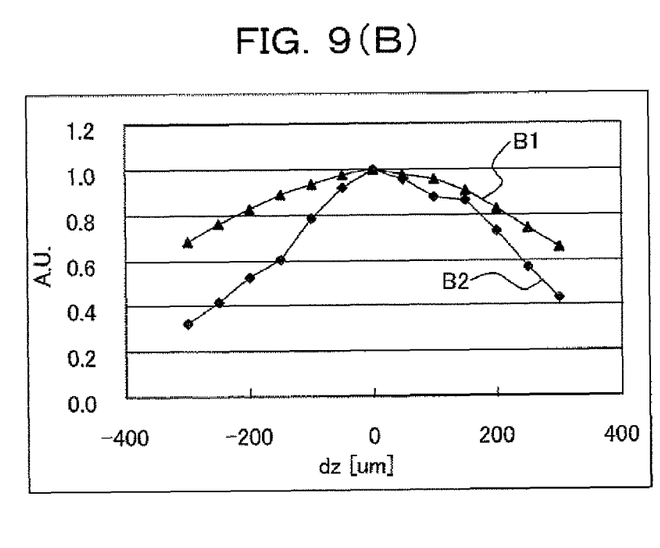

Similarly, FIG. 9(B) is a view illustrating an intensity distribution (B1) of the monitor light emitted from the side face 10B of the substrate 10 in the optical device 20-2 configured in such a manner as seen in FIG. 8 in the vertical direction (dx direction) to the surface of the substrate 10 in comparison with that in an alternative case wherein the first and third grooves 13a, 13c-1 and 13c-2 are not formed. Since, as shown in FIG. 9(B), in the case (B1) wherein the first groove 13a is formed, the diffraction spread of light in the dz direction can be increased in comparison with that in the case (B2), the range wherein the intensity distribution is comparatively great can be increased in the dz direction.

By forming the first and third grooves 13a, 13c-1 and 13c-2 in this manner, the mode diameter of the monitor light is increased and the tolerance of the light reception device 14 for the mounting position can be increased greatly in the upward, downward, leftward and rightward directions in comparison with that in the case wherein the grooves 13a, 13c-1 and 13c-2 are not formed.

Figure 10:
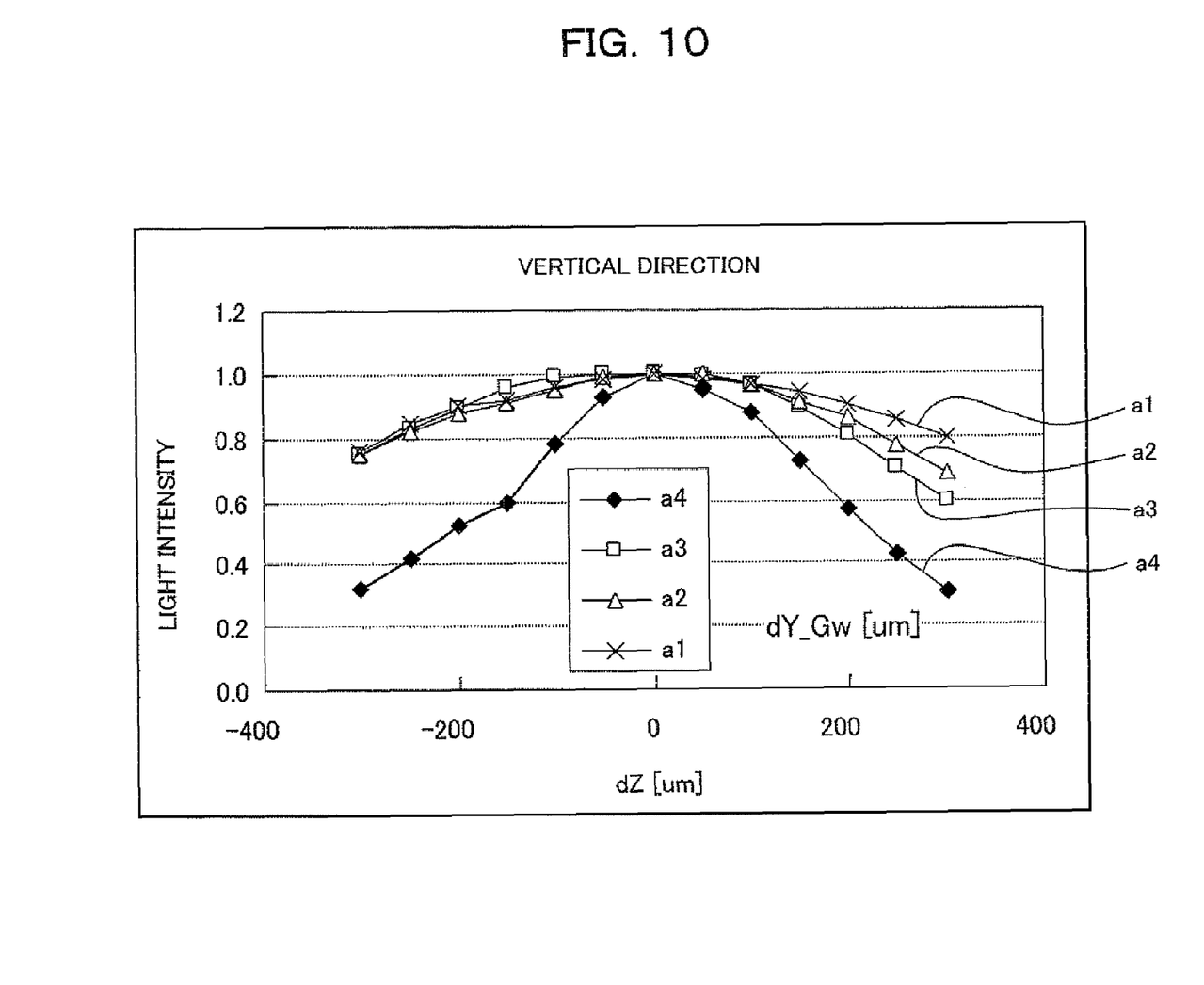

Further, FIG. 10 is a view illustrating a contrast of the intensity distributions of monitor light on the individual substrate side faces 10B where four different optical devices 20-2 are formed such that the distances dY_Gw between the second groove 13b as the reflection groove and the first groove 13a are different from each other. If the distance (a1 to a4: a1<a2<a3<a4) between the second groove 13b and the first groove 13a is varied as shown in FIG. 10, then also the mode diameter of the monitor light varies. Since the groove depths are same as each other, the cutting amount decreases as the distance dY_Gw increases, and therefore, the NA is reduced and the mode diameter of the monitor light on the substrate side face 10B decreases.

Accordingly, the tolerance of the light reception device 14 for the mounting position when the monitor light is received can be optimized with the setting of the distance between the second groove 13b and the first groove 13a. It is to be noted that, since, in FIG. 10, the mode diameter becomes greatest in the case of a1 wherein the distance between the second groove 13b and the first groove 13a is shortest, the tolerance of the light reception device 14 for the mounting position in this case is most preferable.

In this manner, the optical device 20-2 according to the second embodiment of the present invention has an advantage that, since the value of the NA in the vertical direction of the substrate surface 10A can be increased by the first groove 13a and the value of the NA in the parallel direction to the substrate surface 10A can be increased by the third grooves 13c-1 and 13c-2, the tolerance for the mounting position of the light reception device 14 in the vertical and horizontal directions with respect to the substrate surface 10A can be increased by a simple configuration, and adjustment of the mounting position can be simplified in comparison with that by the conventional techniques.

[C] Modifications

The present invention is not limited to the embodiments specifically described above, and variations and modifications can be made without departing from the scope of the present invention.

With the present invention, as regards the shape of the first groove 13a, the first groove 13a may not be formed so as to cover the overall area of a range within which reflection light spreads in the upstream and downstream directions on the upstream side and the downstream side with respect to a position at which reflection light is cut by the first groove 13a. In particular, if, at least at an upstream side position with respect to the first groove 13a at which the reflection light is cut by the first groove 13a, the first groove 13a is formed so as to include a central region in which the reflection light spreads toward the substrate surface 10A direction and have a width, for example, of approximately ⅓ the beam diameter in the leftward and rightward directions, then it can be expected that the diffraction spread can be sufficiently increased in comparison with that in an alternative case wherein the groove 13a is not formed.

Further, while, in the embodiments described above, in order to carry out bias control for the Mach-Zehnder type optical modulator, the first groove 13a is provided as a configuration when the output of the monitor light output waveguide 11G is received, according to the present invention, the configuration is not limited to this. For example, also in a different optical device, the first groove 13a can be configured in order to increase the beam diameter of light which propagates along an optical path, and light having the increased beam diameter can be emitted even if the configuration just described is applied.

Further, even if the configuration of reflection by the second groove 13b is not provided, if at least a configuration corresponding to the first groove 13a is provided, then the beam diameter can be increased, and light having the increased beam diameter can be emitted also in a case where in such a configuration as just described is applied.

Further, at the position of the monitor light output waveguide 11G on the downstream side, that is, in the proximity of the reflection position of the second groove 13b, by reducing the waveguide width, it can be avoided that a higher mode from the MMI which forms the output side coupler 11E (refer to FIG. 1) is reflected by the second groove 13b and propagates in the diffraction propagation region 10a. If such a configuration as just described is applied, then a bias shift caused by interference between higher mode light and zero-order mode light in the diffraction propagation region 10a can be suppressed. Therefore, such tolerance for the mounting position of the light reception device 14 as described above can be increased and the bias shift can be reduced.

The apparatus of the present invention can be fabricated by a person skilled in the art based on the disclosure of the embodiments described above.

What is claimed is:

1. An optical device, comprising:
a substrate;
an optical path formed on said substrate; and
a diffraction propagation region, provided between said optical path and an end face of said substrate, for propagating light emitted from said optical path with diffraction, wherein
said diffraction propagation region includes a first groove that reflects light emitted from the optical path toward a side face of the substrate and a second groove, formed in a path of the reflected light, adapted to partially block components of the reflected light in a depthwise direction of said substrate.

2. The optical device as claimed in claim 1, wherein said optical path is configured so as to emit light in an obliquely downward direction with respect to a horizontal plane of said substrate on which said optical path is formed.

3. The optical device as claimed in claim 1, wherein the optical device further comprises an optical waveguide formed on said substrate;
said first groove is formed on the substrate at an output side of said optical waveguide and is adapted to reflect light outputted from said optical waveguide; and
said optical path includes said optical waveguide and a path wherein the light is reflected by said first groove.

4. The optical device as claimed in claim 3, wherein said optical path further includes a ridge optical path formed on the downstream side in the light propagation direction with respect to said reflection groove.

5. The optical device as claimed in claim 4, wherein said ridge optical path is sandwiched by a pair of third grooves formed on the opposite sides with respect to the light propagation direction.

6. The optical device as claimed in claim 5, wherein one of said third grooves is formed integrally with said first groove.

7. The optical device as claimed in claim 3, wherein the optical device further comprises an optical waveguide for a main signal formed on said substrate, and
said optical waveguide includes an optical monitoring waveguide adapted to monitor guide a monitor light for monitoring the main signal.

8. An optical device, comprising:
a substrate;
an optical path formed on the substrate; and
a diffraction propagation region provided between the optical path and an emission end face of the substrate, the diffraction propagation region including a first groove that propagates light emitted from the optical path toward a side face of the substrate and a second groove adapted to partially block components of the light propagated from the first groove in a depthwise direction of said substrate.

* * * * *